May 9, 1967
B. B. JOFFE ETAL
3,319,067
PORTABLE BETA RADIATION MEASURING HEAD
FOR COATING THICKNESS MEASUREMENT
Filed July 2, 1962
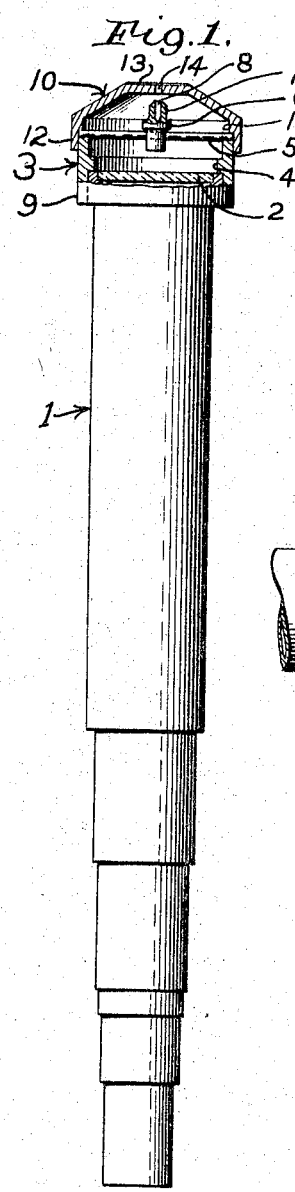
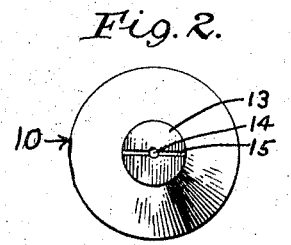
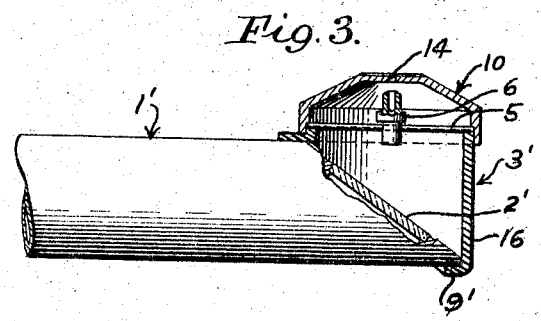
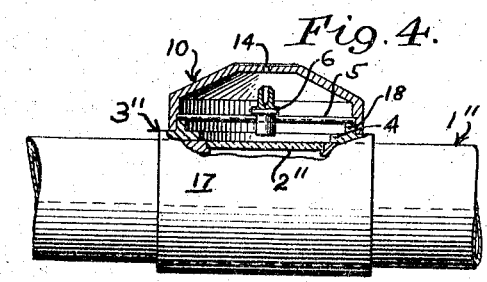
INVENTORS
BORIS B. JOFFE
FREDERICK A. LUNDGREN
BY Christel + Bean
ATTORNEYS

United States Patent Office 3,319,067
Patented May 9, 1967

3,319,067
PORTABLE BETA RADIATION MEASURING HEAD FOR COATING THICKNESS MEASUREMENT
Boris B. Joffe, Buffalo, and Frederick A. Lundgren, Grand Island, N.Y., assignors to Twin City Testing Corp., Tonawanda, N.Y.
Filed July 2, 1962, Ser. No. 206,820
13 Claims. (Cl. 250—105)

This invention relates to a new and useful device in the form of a portable measuring head particularly adapted for use in conjunction with the measurement of coating thickness by radiation techniques.

It is known that when beta rays hit a body, a certain portion of them are reflected. The intensity of the reflected beta rays is a function of the atomic number of the body. If the body is coated, the intensity of beta ray backscatter will be proportional to the thickness of the coating. Therefore, such beta ray backscatter can be used to measure the thickness of coatings, and this measurement technique offers many advantages, particularly in the measurement of ultra-thin coatings.

However, accuracy requires that the radiation source and the counter tube be maintained in predetermined spaced relation to each other and to the object under test. It also is extremely important that the radiation exposure area be restricted to a predetermined area which does not exceed the coating area available, or desired, for test purposes. These requirements pose a problem where, because of the nature or location of the object under test, it is not practical or possible to support the same on a measuring table such as shown in our pending application Ser. No. 192,118, filed May 3, 1962, now Patent 3,115,577 issued Dec. 24, 1963.

Accordingly, it is a primary object of our invention to provide a readily portable radiation emitting and detecting device in which means are provided for maintaining a predetermined spacing between the source, the counter and the object under test, in which the exposure area is restricted, and which can either support the object under test or be aimed thereat in whatever direction may be required.

Another object of our invention is to provide the foregoing in a device wherein the counter, the source, and the object supporting part are readily separable, to permit substitution of a different tube, source and object supporting member, and to enable variation in the spacing between the counter, the source, and the object supporting part.

It also is an object of our invention to provide the foregoing in a portable measuring head which is relatively simple and inexpensive in construction while being extremely durable and dependable in operation.

In one aspect thereof, a portable measuring head constructed in accordance with our invention is characterized by the combination of a radiation counter tube having a window, an adapter mounted on the tube and supporting a radiation source holder in spaced relation to the window, and a cap mounted over the window and the holder, the window being shielded against direct radiation from the holder and the cap having an aperture for exposing an object under test to radiation from the holder, the adapter and the cap being readily separable from the tube and from each other.

The foregoing and other objects, advantages and characterizing features of the portable measuring head of our invention will become clearly apparent from the ensuing detailed description of certain illustrative embodiments thereof, considered in conjunction with the accompanying drawing illustrating the same wherein like reference numerals denote like parts throughout the various views, and wherein:

FIG. 1 is a view, partly in side elevation and partly in longitudinal section, of one form of portable measuring head of our invention;

FIG. 2 is an end elevational view thereof;

FIG. 3 is a fragmentary view, partly in side elevation and partly in longitudinal section, of a modified portable measuring head of our invention; and FIG. 4 is a fragmentary view, partly in side elevation and partly in longitudinal section, of still another form of portable measuring head of our invention.

Referring now in detail to the accompanying drawing, there is shown in FIG. 1 a radiation counter tube 1, intended for operation in the Geiger region and being of a commercially available type, such as those made by Anton Electronic Laboratories, Inc., 1226 Flushing Ave., Brooklyn 37, N.Y. Tube 1 is furnished with a window 2 across its outer end, and being conventional and of known design per se, no further description of its construction or operation is necessary.

In accordance with our invention, there is provided an adapter member 3 which, in the embodiment of FIG. 1, has the form of a circular band or collar having an annular, internal shoulder 4 intermediate its opposite ends. At its outer end, member 3 is diametrically grooved to receive a support rod 5 which is brazed or otherwise secured in place therein. Rod 5 carries a radiation source holder 6 which is secured thereto and which includes a cup 7 containing a cylindrical opening 8, adapted to contain the radiation emitting material. Holder 6 is arranged with its source receiving opening 8 directed outwardly away from window 2 and in alinement with the longitudinal axis of counter tube 1. The body of holder 6 shields the window 2 against direct radiation from source material within cup 7.

The inner end of adapter 3 slip-fits over the window end of tube 1, with the annular shoulder 4 abutting against the shoulder provided by the end of tube 1 and with the annular skirt portion 9 encircling tube 1 in close-fitting, frictional engagement with the cylindrical side wall thereof. By properly locating shoulder 4 within adapter 3, source holder 6 automatically is spaced from window 2 the proper distance when adapter 3 is assembled on tube 1. While adapter 3, through its frictional engagement with the side wall of tube 1, will be securely retained in position thereon, it is nonetheless readily separable from the tube for substitution of another adapter having its shoulder 4 differently located, to provide a different spacing between source holder 6 and window 2, and/or having a source holder 6 containing a different radiation emitting material.

In accordance with our invention, there also is provided a shielding cover, in the form of a cap 10. In the illustrated embodiment, cap 10 has an annular, internal shoulder 11 which abuts the shoulder provided by the outer end of adapter 3, and annular skirt portion 12 which slip-fits over the adapter 3 and encircles the same in close-fitting, frictional engagement therewith. Cap 10 has a frustoconical side wall form, extending from a point inwardly of shoulder 11 to a flat top wall 13. Cap 10 is provided with a central exposure aperture 14 through its top wall 13, and the latter is provided with a positioning groove 15 intersecting the aperture 14.

When the cap 10 is positioned on adapter collar 3, the exposure aperture 14 is alined with the opening 8 of source holder 6. By properly locating shoulder 11, the proper spacing between aperture 14 and source holder 6 is provided automatically upon assembly of cap 10 on adapter 3. Here again, while cap 10, through its frictional engagement with adapter 3, will be securely retained in position thereon, against accidental displacement therefrom, it can readily be removed when it in desired to substitute, in its place, another cap having an exposure aperture of different size, and/or providing a different spacing between aperture 14 and source holder 6, and/or providing a different form of positioning means 15.

In use, the measuring head tube is connected to an appropriate scaling unit, such as the Betascope scaling unit manufactured by Twin City Testing Corporation, 533 S. Niagara St., Tonawanda, N.Y. The object to be tested is exposed through aperture 14 to radiation emitted by the material within cup 7. A portion of the emitted rays will be reflected back through aperture 14 and around holder 6 to the window 2, whereby the intensity of reflected radiation, or backscatter, can be determined. The frusto-conical side wall form of cap 10, accommodates the conical spreading of the reflected rays, while the elongated, cylindrical shape of the source containing opening 8 collimates the radiated beam without creating undesirable self-absorption.

The materials used in forming adapter 3 and cap 10 will shield against radiation except through aperture 14, and aperture 14 is of a size selected to restrict the exposed area so that it will not exceed the coating area which is available for test, or which it is desired to test. This is important, because only the coating under test is exposed to the source through the aperture, and the exposure area is eliminated as a variable.

The positioning groove 15 is useful, for example, in connection with coated wire or other cylindrical objects. Such an object is placed within the groove, which centers and positions the object for exposure of its coating through aperture 14. Other object centering and retaining formations, for example a semi-spherical recess about aperture 14, can be provided. The flat top wall 13 provides a small table surface, on which a flat object can be placed. If the object under test cannot be rested on cap 10, when the head is held in the upright position of FIG. 1, the head can be turned and aimed in any direction desired, and the top wall 13 can still be held against the surface under test.

FIG. 3 shows a modified construction, for use with a known tube 1' having a window 2' extending at a 45° angle across its end. The adaptor 3' carries the rod 5 and source holder 6, and receives the cap 10, as before. However, in this instance, adapter 3' is provided with a tube receiving skirt portion 9' which extends at right angles to the side wall 16 of adapter 3', and which slipfits over the window end of tube 1', in close-fitting, frictional engagement therewith.

With this arrangement, source holder 6 and exposure aperture 14 are alined along an axis normal to the longitudinal axis of tube 1', with the window 2' at a 45° angle to both the tube axis and the exposure axis. The angular relation between the tube axis and the exposure axis can be varied, however, by varying the angular relation between the encircling skirt 9' and the side wall 16 of adapter 3'. Side wall 16 of collar 3' provides a shoulder against which the shoulder comprising the end of tube 1' abuts, whereby the desired, predetermined spacing between source holder 6 and window 2' is maintained, and the frictional engagement of tube 1', adapter 3' and cap 10 permits ready separation thereof while normally holding them in assembled relation.

In FIG. 4, there is shown another known type of tube 1" having a window 2" in its side wall, facing radially outwardly. In this embodiment, cap 10 again remains the same, and frictionally engages about adapter member 3" which, in this case, is provided with a sleeve 17 aligned at right angle to the cap engaging portion 18 of adapter 3' and encircling tube 1" in close-fitting, frictional engagement therewith.

Thus, tube 1" is simply fitted through sleeve 17, until aperture 14 and source holder 6 are centered with respect to window 2". The operation otherwise is as described above, and it will be appreciated that sleeve 17 need not completely encircle tube 1" to perform its intended function.

Accordingly, it is seen that our invention fully accomplishes its intended objects. There is provided, in each of the illustrated embodiments, a portable measuring head wherein the exposure area is restricted and fixed, not variable, and wherein the correct spacing between source, exposure aperture and window is maintained. At the same time, the cap, adapter and tube are readily separable, whereby corresponding parts having different characteristics can be substituted in their place.

While we have described in detail only three embodiments of our invention, that has been done by way of illustration only and without thought of limitation. It is our intention to include, within the scope of the appended claims, all modifications and variations which might naturally occur to those skilled in the art.

Having fully disclosed and completely described our invention, and its mode of operation, what we claim as new is:

1. A beta radiation counter tube having a window, an adapter carrying a beta radiation source holder mounted on said tube, and a cap having an exposure aperture therethrough mounted on said adaptor, said adapter releasably engaging said tube with said holder in predetermined spaced relation to said window, and said cap releasably engaging said adapter with said aperture alined with said holder in predetermined spaced relation thereto.

2. The combination set forth in claim 1, wherein said holder and said aperture are alined with the longitudinal axis of said tube, and said window is normal to said axis.

3. The combination set forth in claim 1, wherein said holder and said aperture are spaced apart along an axis normal to the longitudinal axis of said tube, and said window intersects said axes at acute angles thereto.

4. The combination set forth in claim 1, wherein said holder and said aperture are spaced apart along an axis normal to the longitudinal axis of said tube, and said window intersects said normal axis in spaced relation therealong to said longitudinal axis.

5. The combination including, a beta radiation counter tube having a window, an adapter mounted on said tube and supporting a beta radiation source holder in spaced relation to said window, and a cap mounted on said adaptor over said window and said holder, said window being shielded against direct radiation from said holder, and said cap having an aperture for exposure of an object to radiation from said holder, said adapter and said cap being readily separable from said tube and from each other.

6. The combination of claim 5, wherein said adapter is provided with an internally shouldered recess receiving said tube.

7. The combination of claim 6, wherein said cap is provided with an internally shouldered recess receiving said adapter.

8. The combination of claim 5, wherein said cap has a frusto-conical side wall form and a top wall containing said aperture.

9. The combination of claim 8, wherein said top wall contains a positioning groove intersecting said aperture.

10. A portable measuring head comprising a beta radiation counter tube having across one end thereof a window normal to the longitudinal axis of said tube, an adapter collar carrying a beta radiation source holder centered relative to said collar and directed axially outwardly from one end thereof, the opposite end of said collar fitting over said one end of said tube with said source holder in alinement with said tube axis, said tube and said collar having abutting shoulder spacing said source holder from said window, and a cap having an exposure aperture therein, said cap fitting over said one end of said collar with said aperture in alinement with said source holder, said cap and said collar having abutting shoulders spacing said aperture from said source holder.

11. A portable measuring head comprising a beta radiation counter tube having across one end thereof a window inclined relative to the longitudinal axis of said tube, an adapter carrying a beta radiation source holder directed outwardly from one end thereof, said adapter having another end angularly related to said one end thereof and fitting over said one end of said tube with said source holder directed laterally relative to said tube axis, said tube and said adapter having abutting shoulders spacing said source holder from said window, and a cap having an exposure aperture, said cap fitting over said one end of said adapter with said aperture in alinement with said source, said cap and said adapter having abutting shoulders spacing said aperture from said source holder.

12. A portable measuring head comprising a beta radiation counter tube having in one side thereof a laterally directed window, an adapter carrying a beta radiation source holder and having a sleeve embracing said tube with said holder directed away from said window in spaced relation thereto, and a cap having an exposure aperture therein, said cap fitting over said adapter and covering said window with said aperture in alinement with said source holder, said cap and said adapter having abutting shoulders spacing said aperture from said holder.

13. A portable measuring head comprising a beta radiation counter tube having a window, an adaptor carried by said tube and supporting a beta radiation source holder in spaced relation to said window, and a cap carried by said adaptor, said cap having an exposure aperture therein alined with said holder, wherein said adaptor and said cap are readily separable from said tube and from each other.

References Cited by the Examiner

UNITED STATES PATENTS

| | | | |
|---|---|---|---|
| 2,593,206 | 4/1952 | Short | 250—83.3 |
| 2,964,631 | 12/1960 | Foster | 250—105 |
| 2,964,633 | 12/1960 | Bernstein | 250—83.3 |
| 3,132,248 | 5/1964 | Eggebraaten et al. | 250—106 |

ARCHIE R. BORCHELT, *Primary Examiner.*

RALPH G. NILSON, *Examiner.*